June 2, 1936.   D. FREEMAN   2,042,522
PNEUMATIC TIRE
Filed July 22, 1935   2 Sheets-Sheet 1

Inventor
David Freeman

By *Clarence A. O'Brien*
Attorney

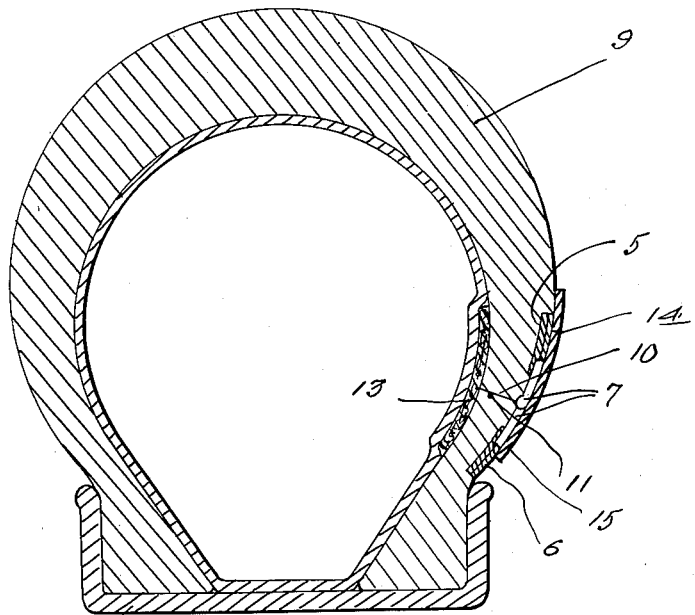
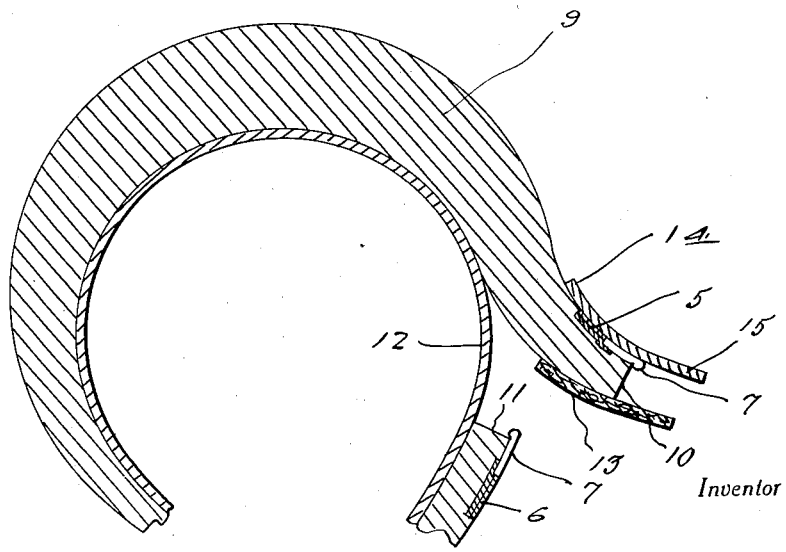

Patented June 2, 1936

2,042,522

UNITED STATES PATENT OFFICE 2,042,522

PNEUMATIC TIRE

David Freeman, Honolulu, Territory of Hawaii

Application July 22, 1935, Serial No. 32,601

1 Claim. (Cl. 152—13)

This invention relates to a novel structural assemblage which may be collectively referred to as a new and improved pneumatic tire and rim or wheel construction and has reference to an especially designed assemblage which is particularly, but not necessarily, adapted for use in connection with automobiles and similar vehicles and conveyances.

The essence of the invention has to do with an especially developed and perfected combination one part of which may be referred to as the pneumatic tire and the other part either as the wheel or the wheel rim as the case may be, and the idea is to be able to change a punctured or disrupted tube as easily and as expeditiously as is possible, the arrangement being such that the old tube can be extracted and the new tube substituted without removing the wheel, rim or tire casing.

Or stated otherwise, the gist of the invention has to do with a more or less conventional tire casing and tube wherein the tire casing is provided with an endless slot which forms an opening to permit the aforesaid quick exchange to be perfected, novel closure and protector means being mounted on the casing within the vicinity of said opening to facilitate exposing the damaged tube and thereafter closing the opening when the repair has been made with the least possible effort and expenditure of time.

As will hereinafter be made manifest, the preferred embodiment of the invention is characterized by the adoption and use of a so-called "zipper" fastener, that is a sectional track device provided with a slide fastener which serves to draw the ends of the slot in the casing together to provide an effective closure.

Other features and advantages will become more readily apparent from the following description and drawings.

In the accompanying drawings wherein like numerals are employed to designate like parts throughout the views:

Figure 3 is a cross sectional view illustrating the assemblage a little more in detail.

Figure 4 is a view along the same lines showing the manner in which the abutting edges or ends of the side wall of the casing are separated to provide the entrance opening to facilitate removal of the damaged tube and replacement of the substitute tube.

Figure 1:
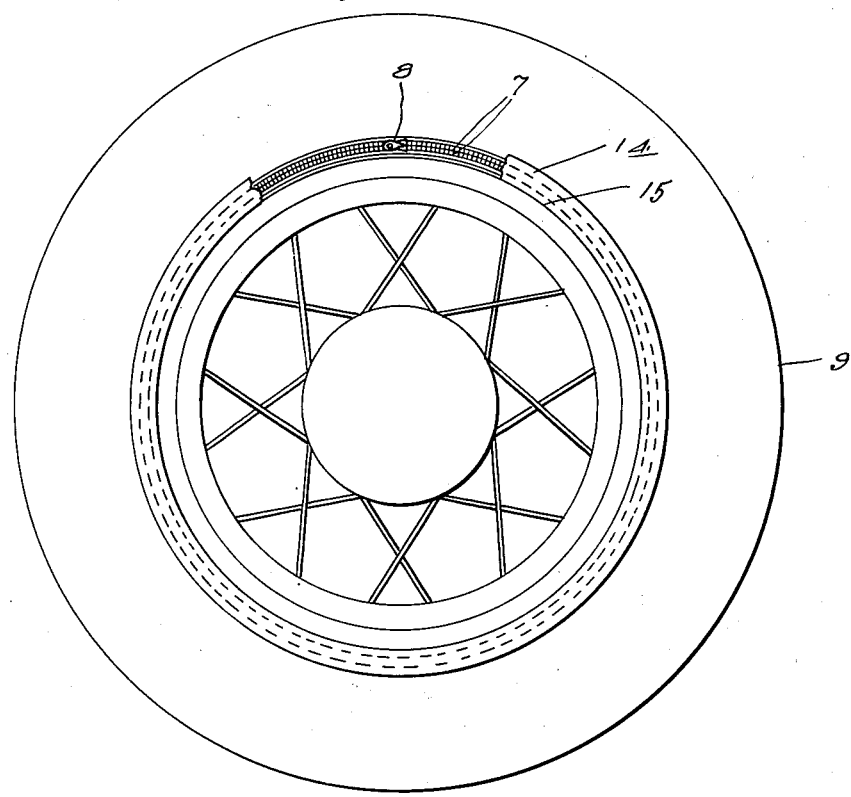
Figure 1 is a side elevational view showing a conventional rim equipped wheel provided with the improved tire, portions of the protector flap being broken away to expose the slide fastener of the "zipper".
Figure 2:
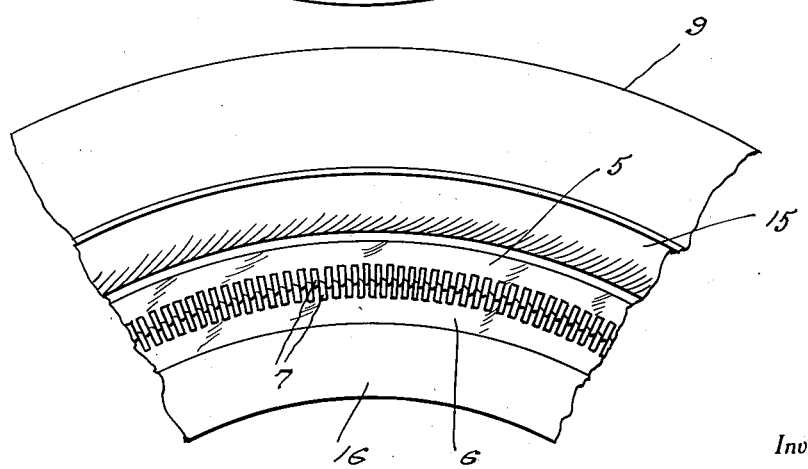
Figure 2 is a fragmentary view on an enlarged scale with the rubber protector flap or strip turned up and out of the way to expose portions of the slide fastener closure means.

By way of introduction and to facilitate the description of the invention I have and will use the expression "zipper" to describe broadly the closure means. It might be said, however, that this means is the conventional type which includes the companion opposed spaced parallel fabric attaching bands 5 and 6 provided with interlocking track forming and fastening cleats 7. These cleats serve to accommodate the conventional slide fastener 8 generally of the "Talon" type. It is evident thus far, that what I do in order to accomplish the desired result is to split one side wall of the casing 9 as shown in Figure 3. That is to say, I provide a slot or opening whose abutting edges are denoted by the numerals 10 and 11. This permits access to be had to the conventional inner tube 12. The parts 5 and 6 are imbedded in the outer surface of the wall so as to provide the desired slide closure fastener to draw the edges 10 and 11 together or to permit them to be separated as desired.

In order to render the structure feasible and practicable I have found it expedient to provide a felt sealing flap as at 13. This has one edge portion attached to the interior of the wall of the casing so that the flexible edge portion is free to overlap the companion portion of the edge 11. This provides a convenient internal protector annulus for the adjacent portion of the inner tube as shown in Figure 3. There is a similar annulus on the exterior of the casing wall carried by the same end portion 10 of said casing. This is preferably of rubber and has one edge portion securely anchored or fastened in place as indicated at 14 with the other edge portion 15 free to serve as the overlapping flap and cover for the "zipper".

Briefly, then, it will be observed that I accomplish the desired results by forming an endless slot in one side wall of the tire casing 9 to define the edges 10 and 11 and to simultaneously define an opening to permit access to be had to the tube 12 to either remove it or replace it as desired, said slot having associated therewith a suitable "zipper" to function as an effective closure and further including the inner and outer protector flaps 13 and 15 to seal the joints and to conceal the "zipper" and to also protect the "zipper" so that it may be easily opened and closed. Needless to say, the advantage of an arrangement of this type is quite evident. It is simple, economical and reliable. It is aptly fitted for the purposes intended, and so far as I know is an innovation in this line of endeavor. One can readily imagine keeping the pneumatic tire casing 9 on the rim 16 and without removing it being able to change inner tubes. All that is necessary with this arrangement is to jack the wheel up, open the slot in the casing 9, pull the tube 12 out and replace it. Hence, the belief that this is an ingenious adaptation.

It is thought that persons skilled in the art to which the invention relates will be able to obtain a clear understanding of the invention after considering the description in connection with the drawings. Therefore, a more length description is regarded as unnecessary.

Minor changes in shape, size and rearrangement of details coming within the field of invention claimed may be resorted to in actual practice, if desired.

Having thus described the invention, what is claimed as new is:

In a pneumatic wheel, a tire casing provided with a circumferentially extending slit in the wall thereof, a felt strip secured to the inside of the casing so as to have one edge portion projecting across the slit, a multiple fastener on the tire casing at the outer side thereof for closing the slit, and a rubber flap extending across the said slit and multiple fastener and secured at one longitudinal edge to the casing at one side of the slit.

DAVID FREEMAN.